United States Patent [19]

Kawakami et al.

[11] Patent Number: 5,040,863
[45] Date of Patent: Aug. 20, 1991

[54] OPTICAL ISOLATOR

[75] Inventors: Shojiro Kawakami; Kazuo Shiraishi; Kazutaka Baba, all of Sendai; Seiji Hattori, Toride, all of Japan

[73] Assignee: Tokyo Electrical Co., Inc., Tokyo, Japan

[21] Appl. No.: 403,491

[22] Filed: Sep. 6, 1989

[30] Foreign Application Priority Data

Nov. 2, 1988 [JP] Japan ................. 63-276030

[51] Int. Cl.$^5$ .............. G02F 1/09; G02B 27/28
[52] U.S. Cl. ................... 359/484; 437/226; 359/282; 359/490; 385/31
[58] Field of Search ............ 350/375, 376, 377, 378, 350/398, 166, 1.7, 96.13; 437/226

[56] References Cited

FOREIGN PATENT DOCUMENTS

| | | |
|---|---|---|
| 55-117108 | 9/1980 | Japan . |
| 60-97305 | 5/1985 | Japan . |
| 60-184225 | 9/1985 | Japan . |
| 62-232614 | 10/1987 | Japan . |
| 63-5318 | 1/1988 | Japan . |
| 63-49728 | 3/1988 | Japan . |

Primary Examiner—Bruce Y. Arnold
Assistant Examiner—Martin Lerner

[57] ABSTRACT

A method of manufacturing an optical isolator which has a rotator capable of rotating a plane of polarization by the Faraday effect, and a polarizer of multilayer structure formed of alternately superposed transparent dielectric films and films having a complex dielectric constant, includes the steps of: forming the rotator as a plate having a large area and the polarizer as an array having a large area; forming an optical isolator array by attaching the polarizer array at least to one surface of the rotator plate in such a manner that the layers of the polarizer array extend perpendicularly to the surface of the rotator plate; and cutting the optical isolator array into a plurality of optical isolator chips. An optical module incorporating the isolator chip includes a case, a semiconductor laser provided in the case, an optical fiber fixed to the case with the optical axis thereof in alignment with that of the semiconductor laser, and the optical isolator chip attached directly or through a transparent member to the end of the optical fiber. The structure enables the optical module to be assembled easily and accurately, and to be of a compact lightweight construction.

10 Claims, 3 Drawing Sheets

OPTICAL ISOLATOR

BACKGROUND OF THE INVENTION

1. Field of the Invention

The present invention relates generally to an optical isolator and, more particularly, to a manufacturing method capable of highly efficiently mass-producing small, lightweight optical isolators having stable characteristics, to a polarizer array for use in the above manufacturing method, and to an optical module incorporating an optical isolator manufactured by the above method.

2. Description of the Prior Art

It is known that a semiconductor laser becomes unstable in its performance when exposed to light reflected by the surface of an optical part such as a condenser lens or an optical fiber cable connected behind the condenser lens. Such a disadvantage of the semiconductor laser is a significant problem in the reliability of optical systems in the field of optical communications and optical instrumentation. An optical isolator may be an effective means for solving such a problem.

Basically, an optical isolator comprises polarizers and a Faraday rotator as typically illustrated in FIG. 1. The optical isolator shown in FIG. 1 comprises a pair of polarizers 1, and a Faraday rotator 2 disposed between the polarizers 1. The polarizers 1 are birefringent prisms or polarizing beam splitters, and the Faraday rotator 2 is a magnetic garnet crystal which is surrounded by an annular permanent magnet 3 for applying a magnetic field thereto. The polarizers 1, the Faraday rotator 2 and the permanent magnet 3 are contained in a case 4.

The optical isolator thus constructed, however, has disadvantages that it has a large size with considerable weight since the components, particularly the polarizers 1, are large.

The inventors herein proposed a novel optical isolator capable of solving the foregoing problems and having structures as disclosed in Japanese Patent Publication No. 61-16961. As shown in FIGS. 2(A)-2(C), this optical isolator comprises a pair of polarizers 5 and 6, a Faraday rotator 7 and a permanent magnet 8. The polarizer 5 is formed by alternately superposing transparent dielectric films 5a of several thousands of angstroms in thickness and films 5b having complex a dielectric constant, formed of metal or semiconductive material and having a thickness of several tens of anstroms (FIG. 2(A)), and the polarizer 6 is similarly formed by alternately superposing transparent dielectric films 6a and films 6b having a complex dielectric constant (FIG. 2(C)). These polarizers 5 and 6, when compared with those shown in FIG. 1, are very small and very lightweight. However, a method of manufacturing the optical isolator of such a construction has the following technical problems.

In manufacturing the optical isolator shown in FIG. 2(B) the minute polarizers 5 and 6 have hitherto been applied to opposite end surfaces of the Faraday rotator 7. Therefore, skilled labor and much time are required for assembling the optical isolator, and hence this manufacturing method is not suitable for mass production, and optical isolators manufactured by this method ar subject to large quality variations.

Furthermore, in assembling the optical isolator shown in FIG. 2(B), the polarizers 5 and 6 must be applied to the corresponding end surfaces of the Faraday rotator 7 with the layers of the films 6b of the polarizer 6 turned accurately by an angle of 45° relative to the layers of the films 5b of the polarizer 5. It is a difficult assembly operation to position the polarizer 6 relative to the polarizer 5 because of their minute size, resulting in large variations in characteristics of the optical isolators thus obtained.

The optical isolator has often been combined with a semiconductor laser etc. to form an optical module, an example thereof being illustrated in FIG. 3. This optical module comprises a semiconductor laser a, an optical fiber cable b having the same optical axis as that of the semiconductor laser a, a Faraday rotator d, a permanent magnet c surrounding the Faraday rotator d, a lens e for controlling a laser beam, a polarizer f and a case g accommodating those components. The Faraday rotator d, the lens e and the polarizer f are arranged between the semiconductor laser a and the optical fiber cable b.

This optical module is not provided with any polarizer between the semiconductor laser a and the Faraday rotator d. Although this structure satisfies the requirements in a certain range, it is desirable to replace the Faraday rotator d and polarizer f with an optical isolator of the type having a pair of polarizers. The optical isolator disclosed in the above Japanese Patent Publication would make it possible to miniaturize and reduce the weight of the optical module to a considerable extent. However, as mentioned above, the method of manufacturing the optical isolator of FIG. 2(B) has the problem that it is not possible to mass-produce optical isolators having stable characteristics. Particularly, once an optical module is assembled, it is impossible to change the optical isolator incorporated therein, and hence, the optical isolator must undergo strict inspection, thus causing its price to be very expensive.

Furthermore, since the components of the optical module in FIG. 3 are arranged at intervals in alignment with an optical axis, a simple replacement of the Faraday rotator d and the polarizer f with the optical isolator in FIG. 2(B) will require troublesome alignment of the optical axes of the components.

SUMMARY OF THE INVENTION

Accordingly, it is an object of the present invention to provide an optical isolator manufacturing method which is suitable to mass production of small and lightweight optical isolators having superior quality and stable characteristics.

Another object of the invention is to provide a polarizer array for use in carrying out the optical isolator manufacturing method.

It is a further object of the invention to provide an optical module which can be assembled relatively easily and which incorporates an inexpensive optical isolator.

According to the invention, there is provided a method of manufacturing an optical isolator which has a rotator adapted to rotate a plane of polarization by the Faraday effect and a polarizer of a multilayer structure comprising alternately superposed transparent dielectric films and films having a complex dielectric constant. The method starts with the steps of forming the rotator as a plate having a large area and forming the polarizer as an array having a large area. The polarizer array is then attached to at least one surface of the rotator plate in such a manner that the layers of the polarizer array extend perpendicularly to the surface of the rotator plate, thereby forming an optical isolator array. Then the optical isolator array is cut into a plurality of optical isolator chips.

A polarizer array for use in carrying out the above method comprises a lamination of a plurality of component polarizer plates each comprising a flat substrate and alternately superposed layers of transparent dielectric films and films having a complex dielectric constant formed on the flat substrate.

According to another aspect of the invention, there is provided optical module which includes a case, a semiconductor laser housed in the case, an optical fiber fixed to the case with the optical axis thereof in alignment with the optical axis of the semiconductor laser, and an optical isolator housed in the case and disposed between the semiconductor laser and the optical fiber. The optical module is characterized in that the optical isolator is manufactured by the above method and is attached directly or through a transparent member to the end of the optical fiber.

Preferably, the rotator is formed of garnet capable of rotating a plane of polarization in the light wave band, while the films having a complex dielectric constant of the polarizer are formed of metal.

In the manufacturing method of the invention, the polarizer array having the large area is attached to the rotator plate also having the large area. Therefore, accuracy of such attachment, which should be in a manner that the layers of polarizer extend perpendicularly to the surface of rotator, is improved with increased accuracy of positioning the polarizer relative to the rotator, when compared with the conventional method in which the minute polarizer is attached to the rotator. Further, the optical isolator chips which are obtained by cutting the isolator array are uniform in characteristics.

Also, the optical module of the aforesaid construction includes the optical isolator chip having stable characteristics and attached to the end of optical fiber. Accordingly, the optical axes of the components including the optical fiber and semiconductor laser can simply be aligned in assembling the optical module.

BRIEF DESCRIPTION OF THE DRAWINGS

The above and other objects, features and advantages of the present invention will become more apparent from the following description taken in conjunction with the accompanying drawings, in which.

DESCRIPTION OF THE PREFERRED EMBODIMENTS

Figure 4:
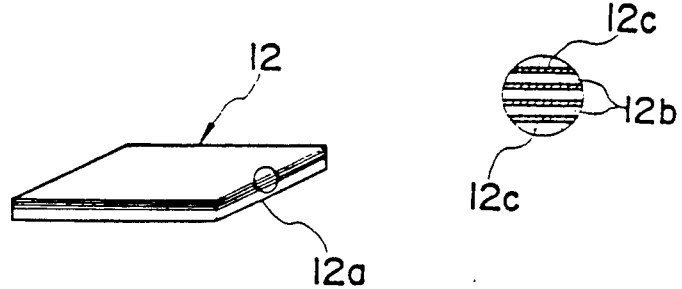
FIGS. 4(A'), 4(B), 4(C), 4(D) and 4(E) are illustrations of assistance in explaining the steps of an optical isolator manufacturing method embodying the present invention.
Figure 4:
Figure 4:
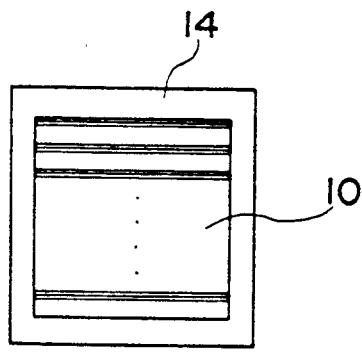
Figure 4:
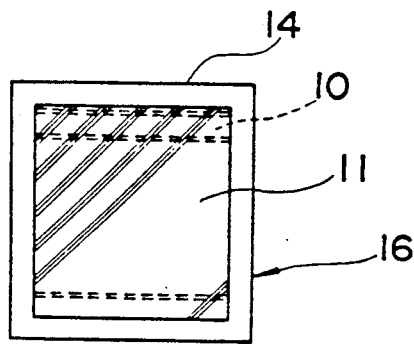
Figure 4:
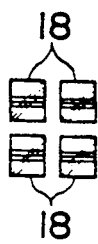

Referring first to FIGS. 4(A), 4(A') and 4(B), there is illustrated a polarizer array 10 which is formed by superposing a plurality of component polarizer plates 12. The component polarizer plate 12 has a large area as compared with that of an optical isolator chip (as described below) of, for example, 2 mm×2 mm in area. The component polarizer plate 12 consists of a flat substrate 12a, and alternate superposed layers of transparent dielectric films 12b and complex dielectric films 12c formed on the substrate 12a. Material from which the substrate 12a and the transparent dielectric films 12b are formed may be fused quartz, while the films 12c having a complex dielectric constant may be formed of metal such as aluminum, silver, copper or gold. The transparent dielectric films 12b and the films 12c are formed on a surface of the substrate 12a by a vapor deposition process to have thicknesses, for example, in the range of 4,000 to 10,000 angstroms and in the range of 50 to 200 angstroms, respectively.

The component polarizer plates 12, after being cut to an appropriate size, are laminated by an adhesive such that the transparent dielectric film 12b or the film 12c of each component polarizer plate 12 is in contact with the substrate 12a of the adjacent component polarizer plate 12. Thus, the polarizer array 10 as shown in FIG. 4(B) is formed.

After one end surface of the polarizer array 10 perpendicular to the layers of films 12b and 12c is ground, array 10 is attached at the ground surface and by an adhesive to a surface of a rotator 14 in the form of a plate as shown in FIG. 4(C). The adhesive used for bonding the polarizer array 10 to the rotator plate 14 is preferably an optically homogeneous adhesive having a light transmittance substantially the same as that of the transparent dielectric films 12b, an example being an ultraviolet setting adhesive. The adhesive is not necessarily applied to the entire joining surface of the polarizer array 10. In the case that the polarizer array is used as it is, the adhesive may be applied only to portions of the joining surface, such as the periphery of the joining surface of polarizer array 10. The rotation plate 14 is adapted to rotate a plane of polarization of light by the Faraday effect and is formed of, for example, magnetic garnet. The joining surface of the rotator plate 14 is ground prior to adhesion and, when necessary, is coated with an antireflection coating.

Following attachment of the polarizer array 10 to one surface of the rotator plate 14, another polarizer array 11, which has the same structure as the polarizer array 10, is attached to the opposite surface of the rotator plate 14 in the same manner. The array 11 should be so positioned that the layers of the component films 12b and 12c of the array 11 is turned by substantially an angle of 45° to the layers of the component films of the array 10. This positioning of the polarizer array 11 is carried out, for example, by a microscopic means using infrared rays. Thus, the pair of polarizer arrays 10 and 11 are applied to respective surfaces of the rotator plate 14 to form an optical isolator array 16 as shown in FIG. 4(D).

Then, the optical isolator array 16 is cut by a dicing saw or other suitable means into a plurality of optical isolator chips 18 as shown in FIG. 4(E). In case the optical isolator chip 18 should have an area on the order of one square centimeter, several tens to several hundreds of optical isolator chips 18 can be obtained from the single array 16.

Thus, the optical isolator manufacturing method uses the polarizer arrays 10 and 11 having large areas, and the rotator plate 14 also having a large area. Accordingly, this method make it possible to position the polarizer arrays 10 and 11 more accurately relative to the rotator plate 14 and facilitates the attaching operation of the polarizer arrays, as compared with the conventional method in which minute polarizers are attached to opposite surfaces of a small rotator. Furthermore, since a plurality of the optical isolator chips 18 are obtained by cutting the array 16 formed by attaching the polarizer arrays 10 and 11 to respective opposite surfaces of the rotator plate 14, the optical isolator chips 18 are uniform in characteristics.

In the foregoing embodiment, the pair of polarizer arrays 10 and 11 are applied to respective opposite surfaces of the rotator plate 14. However, there have been provided other types of optical isolators, one of which has a single polarizer attached to one of the surfaces of rotator, while in another isolator two rotators ar arranged in series with a common polarizer interposed therebetween with two polarizers attached to remaining surfaces of the two rotators. The method according to the invention is also applicable to manufacture of those optical isolators by attaching the polarizer array to at least one of the surfaces of the rotator. Further, the optical isolator array 16 is not necessarily cut or divided into individual optical isolator chips, but may be divided into strips each having a longitudinal or transverse arrangement of a plurality of the optical isolator chips 18.

Figure 5:
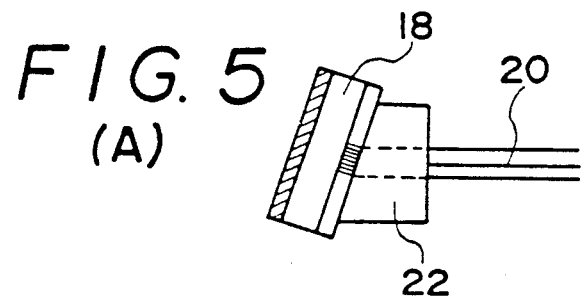
FIGS. 5(A) and 5(B) are views showing an example of use of an optical isolator manufactured by the above method.
Figure 5:
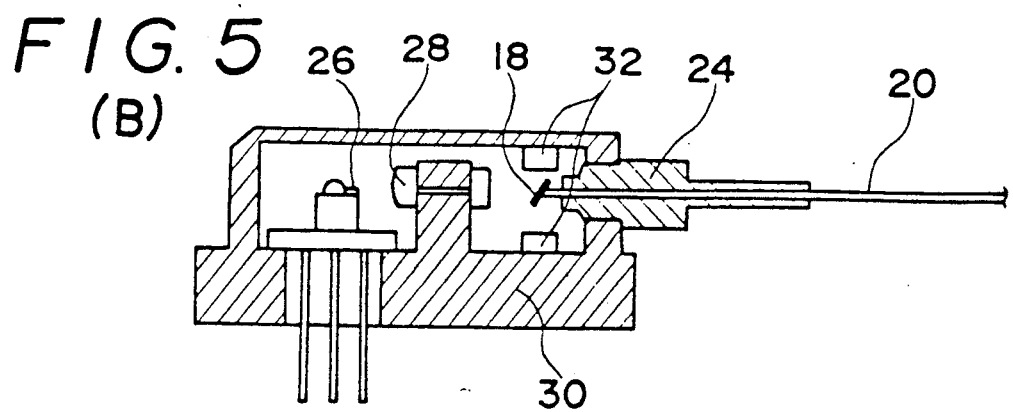

Reference is now made to FIGS. 5(A) and 5(B) in which is shown an example of usage of an optical isolator chip 18 obtained by the foregoing method, and being incorporated into an optical module. In this example, the optical isolator chip 18 is fixed through a transparent member 22 to the entrance surface of an optical fiber cable 20 which is held by a holding member 24. The holding member 24 is integrally fixed to a case 30 which accommodates a semiconductor laser 26, a control lens 28 for controlling a laser beam, and an annular permanent magnet 32 disposed so as to surround the optical isolator chip 18 when the holder 24 is mounted to the case 30. The surface of the transparent member 22 on which the optical isolator chip 18 is fixed is cut obliquely so that a laser beam projected by the semiconductor laser 26 will not be reflected directly toward the control lens 28 by the isolator chip 18. The transparent member 22 serves to fix the optical isolator chip 18 obliquely to the axis of the optical fiber cable 20. A hole as indicated by broken lines in FIG. 5(A) may be formed in the transparent member 22 to simplify the positioning of the optical isolator chip 18 relative to the optical fiber cable 20 and to fix the optical fiber cable 20 more firmly to the member 22.

Figure 1:
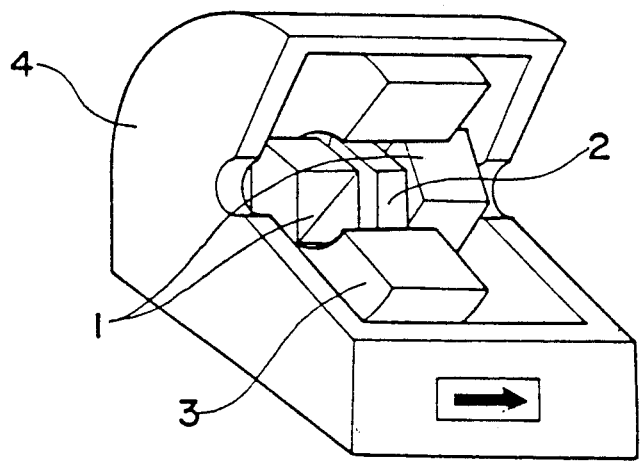
FIG. 1 is a partly cutaway perspective view of a prior art optical isolator.
Figure 2A:
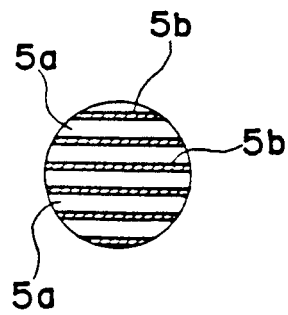
FIGS. 2(A)–2(C) is a partly cutaway perspective view and fragmentary enlargements illustrating another optical isolator the prior art.
Figure 2B:
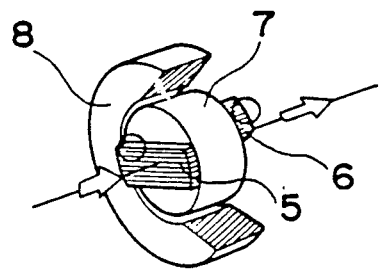
Figure 2C:
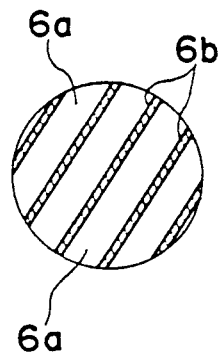
Figure 3:
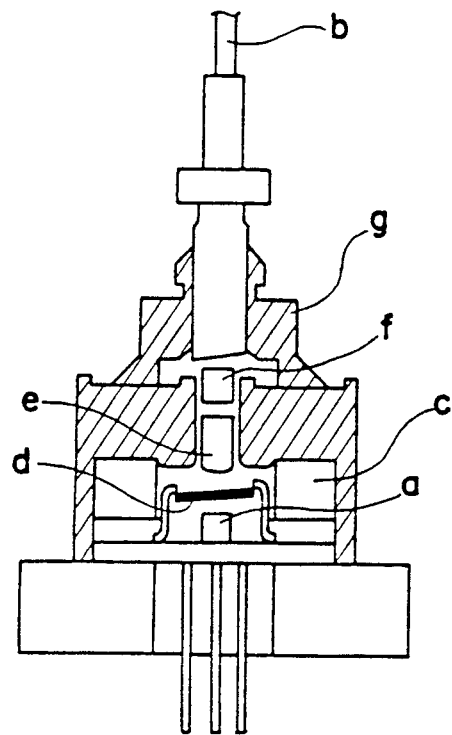
FIG. 3 is a sectional view of a prior art optical module.

As is seen from the above example, the optical module employing the optical isolator chip 18 is far smaller and lighter than the conventional optical module shown in FIG. 3. Since the optical isolator chip 18 is fixed beforehand to the end of the optical fiber cable 20, it can easily be aligned with the optical axes of the control lens 28, etc. Further, the general construction of the optical module is simplified and allows the optical module to be readily assembled.

If another end of the optical fiber 20 is to be connected to a polarization-dependent element, it is preferable to employ an optical fiber of a type which can maintain a plane of polarization. When desired, the optical isolator chip 18 may be attached directly to the end surface of the optical fiber cable 20 in such a manner that the surface of the polarizer chip is in close contact with the end surface of the optical fiber cable 20.

As is apparent from the foregoing description, the optical isolator manufacturing method in accordance with the present invention make it possible to produce a plurality of optical isolator chips in a lot by dividing a large optical isolator array. The optical isolators produced by the present method are uniform in characteristics, and the method is highly suitable for the mass production of optical isolators as compared with the conventional method.

Furthermore, the optical module incorporating the optical isolator manufactured by the present method has stable characteristics, is inexpensive and can readily be assembled.

Although the invention has been described in its preferred form with a certain degree of particularity, obviously many changes and variations are possible thereto. It is therefore to be understood that the present invention may be practiced otherwise than as specifically described herein without departing from the scope and spirit thereof.

What is claimed is:

1. A method of manufacturing an optical isolator having a rotator adapted to rotate a plane of polarization by the Faraday effect, and a polarizer of a multilayer structure comprising alternately superposed transparent dielectric films and films having a complex dielectric constant, said method comprising the steps of:

forming said rotator as a plate having a large area;

forming each of a plurality of component polarizer plates by alternately superposing said transparent dielectric films and said films having a complex dielectric constant on a substrate;

laminating said component polarizer plates such that one of said transparent dielectric film and said film having a complex dielectric constant of one said plate is in contact with said substrate of an adjacent component polarizer plate, thereby forming plural said polarizers as arrays each having a large area;

attaching one said polarizer array to one surface of said rotator plate in such a manner that the layers of said film of said one polarizer array extend perpendicularly to said one surface of said rotator plate;

attaching another said polarizer array to an opposite surface of said rotator plate in such a manner that the layers of said films of said another polarizer array extend at an angle of 45° relative to said layers of said one polarizer array, to thereby form an optical isolator array; and cutting said optical isolator array into a plurality of optical isolator chips.

2. A method as claimed in claim 1, wherein said rotator is formed of garnet capable of rotating a plane of polarization in the light wave band.

3. A method as claimed in claim 1, wherein said films having a complex dielectric constant of said polarizer are formed of metal.

4. An optical module comprising:

a case;

a semiconductor laser housed in said case;

an optical fiber fixed to said case with the optical axis thereof in alignment with the optical axis of said semiconductor laser; and an optical isolator housed in said case and disposed between said semiconductor laser and said optical fiber, said optical isolator comprising a structure resulting from:

forming a rotator plate having a large area and adapted to rotate a plane of polarization by the Faraday effect;

forming each of a plurality of component polarizer plates by alternately superposing transparent dielectric films and films having a complex dielectric constant on a substrate;

laminating said component polarizer plates such that one of said transparent dielectric film and said film having a complex dielectric constant of one said plate is in contact with said substrate of an adjacent component polarizer plate, thereby forming plural polarizers as arrays each having a large area;

attaching one said polarizer array to one surface of said rotator plate in such a manner that the layers of said films of said one polarizer array extend perpendicularly to said one surface of said rotator plate;

attaching another said polarizer array to an opposite surface of said rotator plate in such a manner that the layers of said films of said another polarizer array extend at an angle of 45° relative to said layers of said one polarizer array, to thereby form an optical isolator array; and cutting said optical isolator array into a plurality of optical isolator chips;

one of said optical isolator chips being attached to said optical fiber as said optical isolator.

5. An optical module as claimed in claim 4, wherein said one optical isolator chip is directly attached to an end of said optical fiber.

6. An optical module as claimed in claim 4, further comprising a transparent member disposed between an end of said optical fiber and said one optical isolator chip.

7. An optical module as claimed in claim 6, wherein said transparent member has an oblique surface to which said one optical isolator chip is attached.

8. An optical module as claimed in claim 4, wherein said rotator plate is formed of garnet capable of rotating a plane of polarization in the light wave band.

9. An method as claimed in claim 4, wherein said films having a complex dielectric constant of said component polarizer plates are formed of metal.

10. An optical module comprising:

a case;

a semiconductor laser housed in said case;

an optical fiber fixed to said case with the optical axis thereof in alignment with the optical axis of said semiconductor laser; and an optical isolator housed in said case and disposed between said semiconductor laser and said optical fiber, said optical isolator comprising a structure resulting from:

forming a rotator plate having a large area and adapted to rotate a plane of polarization by the Faraday effect;

forming a polarizer array of large area and having a multilayer structure comprising alternately superposed transparent dielectric films and films having a complex dielectric constant;

attaching said polarizer array to at least one surface of said rotator plate in such a manner that the layers of said films of said polarizer array extend perpendicularly to said surface of said rotator plate, to thereby form an optical isolator array; and cutting said optical isolator array into a plurality of optical isolator chips;

a transparent member disposed at an end of said optical fiber, said transparent member having an oblique surface; and one of said optical isolator chips being attached to said oblique surface as said optical isolator.

* * * * *